US009341143B2

United States Patent
Fedin

(10) Patent No.: US 9,341,143 B2
(45) Date of Patent: May 17, 2016

(54) METHOD OF ORGANIZING THE WORKING PROCEDURE IN A SPARK IGNITION GAS PISTON ENGINE

(76) Inventor: Konstantin Ivanovich Fedin, Moscow (RU)

(*) Notice: Subject to any disclaimer, the term of this patent is extended or adjusted under 35 U.S.C. 154(b) by 206 days.

(21) Appl. No.: 14/373,087

(22) PCT Filed: Apr. 20, 2012

(86) PCT No.: PCT/RU2012/000308
§ 371 (c)(1),
(2), (4) Date: Jul. 18, 2014

(87) PCT Pub. No.: WO2013/157981
PCT Pub. Date: Oct. 24, 2013

(65) Prior Publication Data
US 2014/0360468 A1    Dec. 11, 2014

(51) Int. Cl.
*F02M 21/02* (2006.01)
*F02B 19/12* (2006.01)

(52) U.S. Cl.
CPC ............ *F02M 21/0209* (2013.01); *F02B 19/12* (2013.01); *Y02T 10/125* (2013.01)

(58) Field of Classification Search
CPC .... F02M 21/02; F02M 21/0209; F02B 19/12; Y02T 10/125
See application file for complete search history.

(56) References Cited

U.S. PATENT DOCUMENTS

| | | | | |
|---|---|---|---|---|
| 3,443,552 A | * | 5/1969 | Von Seggern | ........... F02B 19/10 123/262 |
| 3,933,134 A | * | 1/1976 | Yagi | .................... F02B 19/1061 123/259 |
| 4,096,844 A | * | 6/1978 | Mackaness | ............. F02B 19/06 123/193.6 |
| 2006/0130804 A1 | | 6/2006 | Teraji et al. | |
| 2009/0133667 A1 | | 5/2009 | Inoue et al. | |
| 2011/0100322 A1 | | 5/2011 | Gruber et al. | |

FOREIGN PATENT DOCUMENTS

JP    2001173446    6/2001
RU    2269657    2/2006

OTHER PUBLICATIONS

Search report in PCT/RU2012/000308, dated Jan. 17, 2013.

* cited by examiner

*Primary Examiner* — Hieu T Vo
(74) *Attorney, Agent, or Firm* — Bardmesser Law Group

(57) ABSTRACT

A piston engine intakes, at the compression stage, lean gas-air mixture from a cylinder to the ignition chamber. The residual gases are at 500° C. to 700° C., and are composed of: carbon dioxide 6.7% to 5.6%, oxygen 6.6% to 8.8%, water vapor 12.8% to 19.8% with the air excess factor 1.5 to 1.8, are preserved in the ignition chamber and are used for initiating, at the contact, and mixing with the gas-air mixture, the reactions of combined conversion of the lowermost alkanes (methane, ethane, propane, butane, etc.), into hydrogen and carbon monoxide; intensifying reactions of combined conversion in the compression cycle, by increasing pressure and, therefore, temperature of the gas-air mixture in the cylinder and in the ignition chamber, up to 5-5.5 MPa and 500-600° C., at the moment of the spark. The ignition chamber can be made of catalytic material, e.g., nickel heat-resistant steel.

7 Claims, 2 Drawing Sheets

METHOD OF ORGANIZING THE WORKING PROCEDURE IN A SPARK IGNITION GAS PISTON ENGINE

CROSS-REFERENCE TO RELATED APPLICATIONS

This application is a US National Phase of PCT/RU2012/000308, filed on 20 Apr. 2012, which is incorporated herein by reference.

BACKGROUND OF THE INVENTION

1. Field of the Invention

The present invention is related to engine construction technologies and can be applied in spark ignition gas piston engines operating mainly on lean mixtures of hydrocarbon gases.

2. Description of the Related Art

A gas piston engine with precombustion chamber torch ignition is known, and comprises a cylinder, a cylinder head with the main spark plug located along the cylinder axes, a precombustion chamber with an additional spark plug and a gas inlet valve (see e.g., RU Patent No. 2080471) (Reference [1]). However, a drawback of such design is complexity and high cost of the fuel system. Nevertheless, this design has been implemented in construction of powerful engines, mainly, engines producing over 2 megawatts.

In another design (see e.g., U.S. Pat. No. 5,611,307) (Reference [2]), the rich hydrogen-air mixture goes through a pilot-actuated valve to a precombustion chamber, with the mixture, having been ignited by a spark plug, enflaming the main lean fuel-air mixture in the engine cylinder. This method is more efficient compared to Reference [1], but, at the same time, is much more complicated, since it requires two different kinds of fuel, where the second kind of fuel consists of hydrogen incoming as a hydrogen-air mixture through a pilot-actuated valve. In one of the claimed variants, the possibility of the lean fuel-air mixture reforming in the precombustion chamber by means of a catalyst with electric heating is mentioned. In case of hydrogen shortage, the hydrogen is provided from outside as a hydrogen-air mixture incoming through the pilot-actuated valve. However, the design in Reference [2] is probably not actually workable because the heating unit consisting of a substrate-electric heater and a mesh-catalyst are located inside the precombustion chamber and cannot withstand the destructive impact of cyclic pressure and temperature jumps from 0.1 to 11 MPa and from 50 to 1700° C. every 80 milliseconds at the engine rotation frequency of some 1500 rpm. The method has not found much use.

Russian Patent No. 2099549 (Reference [3]) describes a method of igniting a fuel-air, mainly a lean, mixture in an internal combustion engine having a main combustion chamber and an ignition chamber (hereafter, this term is used as a synonym for precombustion chamber), where the method comprises the following stages: inletting, at the compression stroke, a fuel-air mixture from the main combustion chamber to the ignition chamber, igniting the fuel-air mixture, and emitting the inflamed torch to the main combustion chamber at the beginning of the expansion stroke. Here, the main distinctive feature of the method (see FIG. 1) is that the inlet of the fuel-air mixture from the main combustion chamber 1 to the ignition chamber 4 is performed along its central axis through gas-dynamic sensors, where at least one sensor 8 has the one-way throughput capability towards the ignition chamber, whereas the outlet of the ignited torch from the ignition chamber to the main combustion chamber goes along its periphery through the gas-dynamic sensors 9, of which at least two sensors have the one-way throughput capability towards the main combustion chamber and the fire jets are directed towards the conditional circle of the mass centre for a given volume of the main combustion chamber.

To embody the method of Reference [3], a design of several parts of the modified engine was also claimed. FIG. 1 shows such a conventional design, where 1—is the combustion chamber, 2—is the piston, 3—is the engine body, 4—is the ignition chamber, 5—is the ignition device, 8—is the one-way inlet channel (sensor), 9—a one-way outlet channel (sensor). In this publication, only one kind of fuel is used, and its inventors stated that this technical solution offers high reliability and efficiency while consuming lean fuel-air mixtures; however, so far no information is available regarding general application of such technology. The main drawback of the described conventional methods are complexity and high precision requirements to manufacture and process the device components, and also apparently relatively unimpressive performance characteristics.

SUMMARY OF THE INVENTION

The problem to be solved by the present invention consist in developing a method of organizing the working procedure in a spark ignition and gas piston engine, which should be applicable with minimal changes in diesel engines, and used as a basis for manufacturing spark ignition gas piston engines. An engine operated in accordance with the claimed method shows improved performance and is simple in manufacturing.

The basic concept of the claimed invention differs drastically from the conventional approach to designing a gas piston engine. Each known design provides for expulsion of residual gases from the ignition chamber, providing thereby a free space for inletting a rich gas-air or hydrogen-air mixture. The claimed method does not provide for expulsion of residual gases, but on the contrary, it is aimed at an efficient use of the properties intrinsic to the residual gases for enhancing the performance of an engine.

The technical result is achieved due to development of an improved method of organizing the process in a spark ignition gas piston engine, which provides for inletting, at the compression stage, a lean gas-air mixture from the engine cylinder (combustion chamber) to the ignition (precombustion) chamber containing residual gases; composing a hydrogen-air mixture within the ignition chamber by means of a combined conversion of the gas-air mixture components (lowermost alkanes) to hydrogen and carbon monoxide; spark igniting the hydrogen-air mixture; and emitting the inflamed jet to the combustion chamber, which results in inflaming the main lean gas-air mixture.

It should be noted that in this case the fuel is represented by hydrocarbon gases composed of the lowermost alkanes group, such as methane, ethane, propane, butane, etc., which are the components of natural gas, associated petroleum gas, liquefied petroleum gas (propane-butane mixture) and others.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
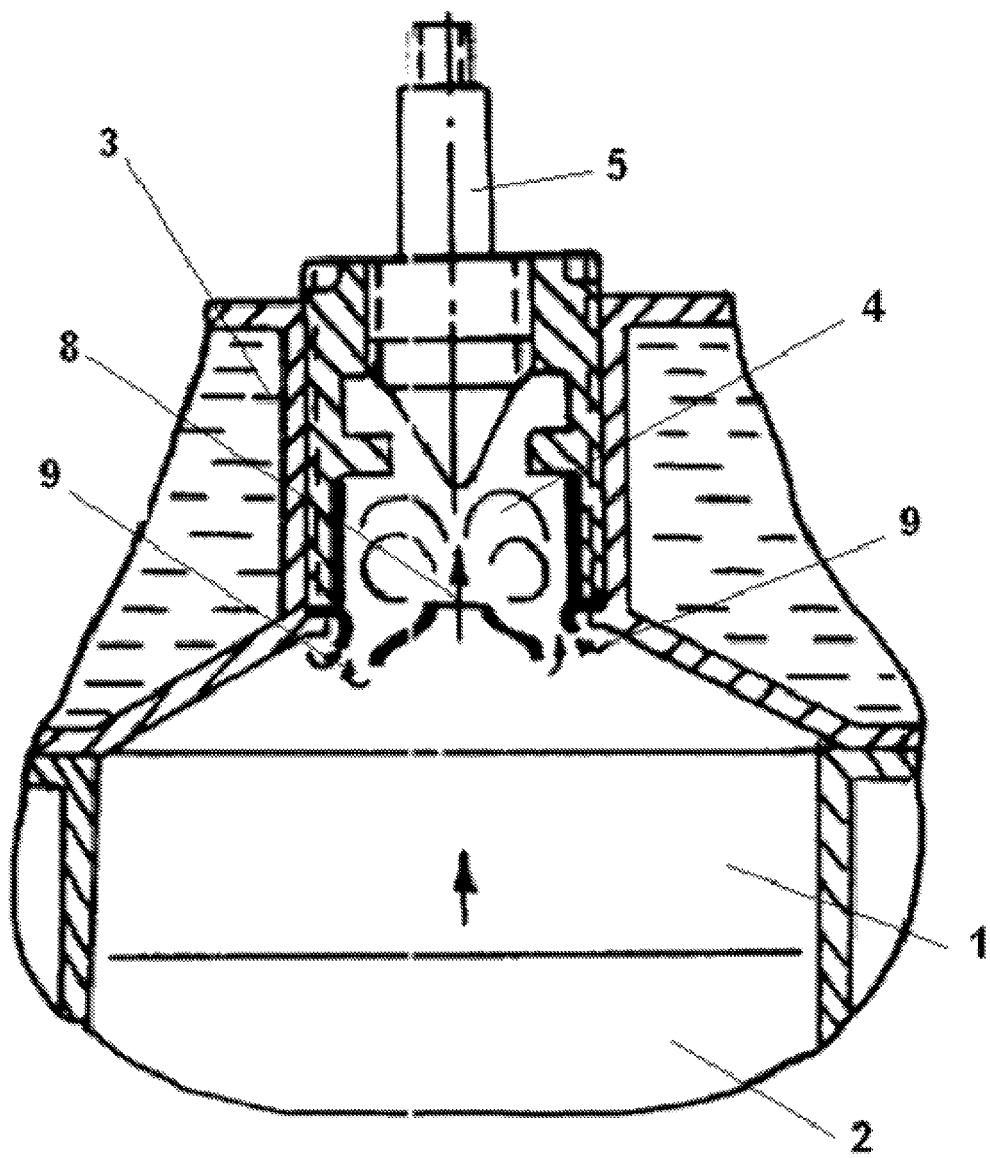
FIG. 1 illustrates part of a conventional internal combustion engine design.

Reference will now be made in detail to the preferred embodiments of the present invention, examples of which are illustrated in the accompanying drawings.

The primary idea as described herein relies on the fact that an internal combustion engine that operates on gas as a fuel (i.e., methane, butane, etc.), and one that operates using a lean fuel-air mixture (e.g., 1:1.5 to 1:1.8), there are residual gases available that contain $CO_2$, oxygen and water vapor. A small ignition chamber is added, where the spark plug ignites the mixture. The ignition chamber is connected to the engine cylinder via a single narrow channel. A small amount of hydrogen can be generated from the fuel, and the spark ignites the hydrogen, which (given the properties of hydrogen) then rapidly propagates through the rest of the cylinder, igniting the remainder of the fuel in the cylinder.

Performance improves dramatically, with fuel efficiency improving by roughly 20-25%. The operating temperatures can be kept in the 500-600 degree Centigrade range (rather than the more typical 700 degrees), which significantly improves engine reliability and engine lifetime.

The claimed invention is based on theoretical research, namely:

Diachenko V. G.—Theory of internal combustion engines, Kharkov: Publishing Centre KhNADU, 2009-500 pp. (Reference [4]); Krylov O. V.—Hydrocarbon conversion of methane to synthetic gas, in *Journal of the Russian chemical society named after D. I. Mendeleev*-M., 2000.-Vol. XLIV-No. 1-pages 19-33 (Reference [5]); Usachev N. Y.—Oxidizing processing of lowermost alkanes: state of the art and prospects, by N. Y. Usachev, V. V. Kharlamov, E. P. Belanova, T. S. Starostina, I. M. Krukovsky, in *Journal of the Russian chemical society named after D. I. Mendeleev*-M., 2008-Vol. LII-No. 4-pages 22-31 (Reference [6]).

Reference [4] teaches that the composition of residual gases (on average, by volume) is as follows: carbon dioxide—6.7 to 5.6%, oxygen—6.6 to 8.8%, water vapor—12.8 to 10.8%, with the air surplus factor—1.5 to 1.8. In contacting and mixing the residual gases remaining in the ignition chamber with the gas-air mixture incoming from the combustion chamber at the compression cycle, the hydrogen-air mixture is composed, and the mixture is highly inflammable.

One of the main conditions for forming a hydrogen-air mixture includes heating the original gas-air mixture, at its contacting and mixing with the residual gases, to a temperature where the reactions of combined conversion of the lowermost alkanes to hydrogen and carbon monoxide start spontaneously.

According to Reference [5] and Reference [6], the reactions of combined conversion are described by the following expressions:

Hydrocarbon Conversion:
$C_nH_{2n+2} + nCO_2 = 2nCO + (2n+1) H_2$.
For methane: $CH_4 + CO_2 = 2CO + 2H_2$. 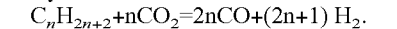
For ethane: $C_2H_6 + 2CO_2 = 4CO + 5H_2$.
For propane: $C_3H_8 + 3CO_2 = 6CO + 7H_2$.
For butane: $C_4H_{10} + 4CO_2 = 8CO + 9H_2$.

Partial Oxidation:
$C_nH_{2n+2} + \tfrac{1}{2}nO_2 = nCO + (n+1) H_2$.
For methane: $CH_4 + \tfrac{1}{2}O_2 = CO + 2H_2$. 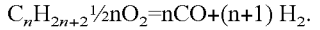
For ethane: $C_2H_6 + O_2 = 2CO + 3H_2$.
For propane: $C_3H_8 + 3/2O_2 = 3CO + 4H_2$.
For butane: $C_4H_{10} + 2O_2 = 4CO + 5H_2$.

Vapor Conversion:
$C_nH_{2n+2} + n H_2O = nCO + (2n+1) H_2$.
For methane: $CH_4 + H_2O = CO + 3H_2$. 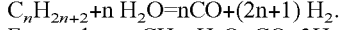
For ethane: $C_2H_6 + 2H_2O = 2CO + 5H_2$.
For propane: $C_3H_8 + 3H_2O = 3CO + 7H_2$.
For butane: $C_4H_{10} + 4H_2O = 4CO + 9H_2$.

The vapor conversion of carbon monoxide to hydrogen occurs in parallel:
$CO + H_2O = CO_2 + H_2$.

Temperature for starting the conversion: for methane $CH_4$ 400° C., for ethane $C_2H_6$ 300° C., for propane $C_3H_8$ and butane $C_4H_{10}$ 200° C., see Reference [6]. 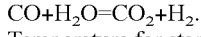

The temperature of the residual gases in the ignition chamber is 500° C. to 700° C., and the temperature of the ignition chamber walls is established within the range of 350° C. to 400° C. (see Reference [4]). Thus, within the ignition chamber, favorable conditions are created for reactions of combined conversion at inletting the lean gas-air mixture to the ignition chamber during the compression cycle. Here, the increase of the reactions intensity depends significantly on the pressure increase and, respectively, the temperature in the ignition chamber during the compression cycle. The above factors are sufficient for producing the optimal conditions for forming a hydrogen-air mixture in the ignition chamber. The resulting hydrogen-air mixture is ignited by a spark and the flame torch enters, through the channel connecting the ignition chamber and the combustion chamber, the combustion chamber and ignites the main lean gas-air mixture.

Figure 2:
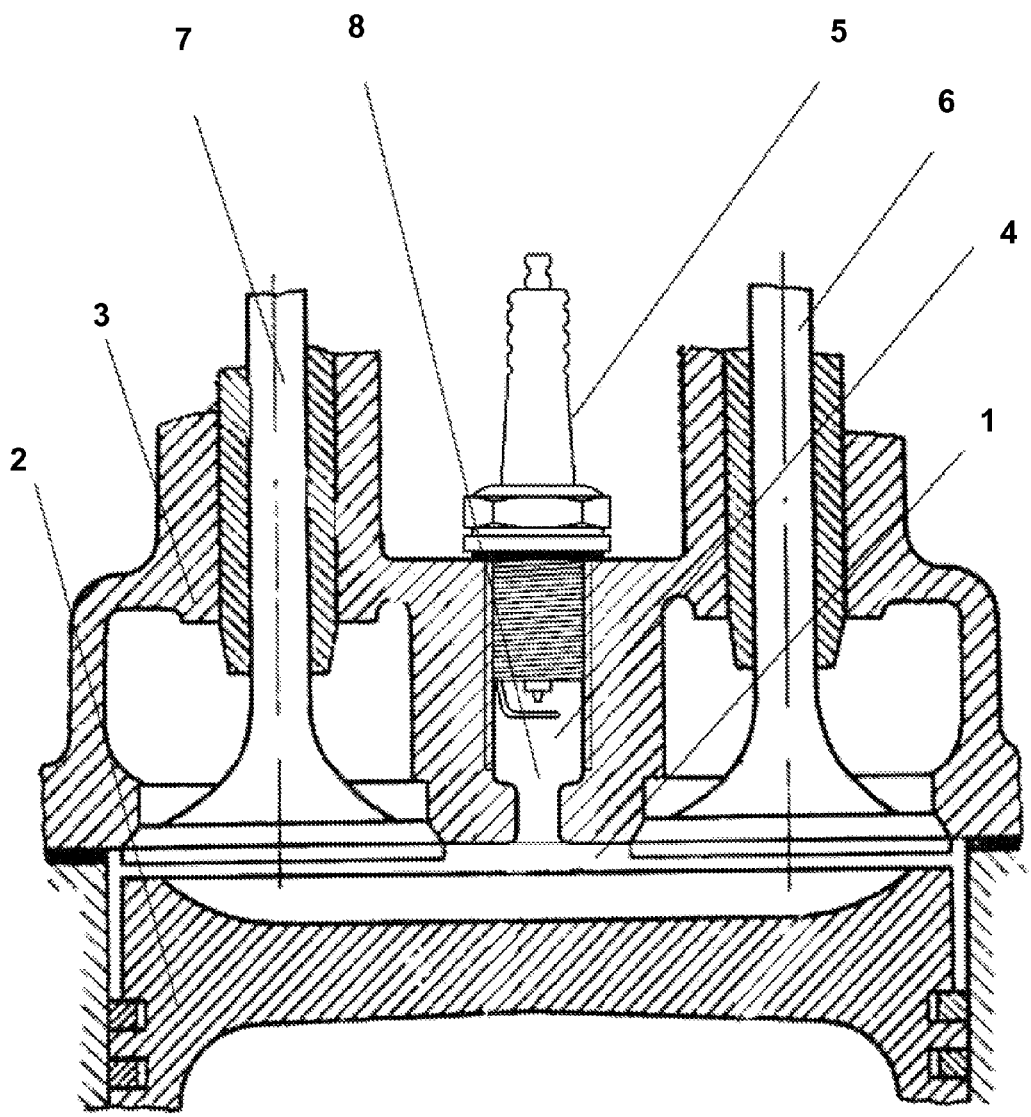
FIG. 2 illustrates a cross-section of a spark ignition gas piston engine designed for embodying the proposed method.

FIG. 2 shows the cross-section of a spark ignition gas piston engine designed for embodying the claimed method. The engine includes a combustion chamber 1 represented by the upper part of the working cylinder; an ignition chamber 4, preferably arranged symmetrically regarding the working cylinder axis and provided with the spark plug 5; a channel 8 connecting the ignition chamber 4 with the combustion chamber 1 limited by the piston 2 and the cylinder head 3. The spark plug 5 is installed in the ignition chamber 4 made, preferably, of a material with catalytic property in respect of the combined conversion reactions, for example, a nickel heat-resistant steel. However, the combined conversion reactions proceed satisfactorily even in the absence of a catalyst. Gas exchange in the engine runs through the inlet valve 6 and the outlet valve 7.

The operating procedure of the spark ignition gas piston engine is arranged as follows.

At the intake stroke a lean gas-air mixture with air excess factor 1.5 to 1.8 goes to the combustion chamber 1 (the engine cylinder) through the inlet valve 6 while the residual gases with the temperature range of 500° C. to 700° C. remain in the ignition chamber 4 and the channel 8 (because the design, namely, a single channel, which makes blasting impossible); the composition of the residual gases by volume is as follows:

carbon dioxide 6.7% to 5.6%, oxygen 6.6% to 8.8%, water vapor 12.8% to 19.8% with the air excess factor 1.5 to 1.8.

At the compression stroke, the lean gas-air mixture starts entering the ignition chamber 4 from the combustion chamber 1 (the engine cylinder) through the channel 8. The contact and mixing of the gas-air mixture with the residual gases in the channel 8 and the ignition chamber 4 results in the combined conversion reactions of the lowermost alkanes (methane, ethane, propane, butane and others) into hydrogen and carbon monoxide. In the process of the compression cycle the pressure and, respectively, the temperature of the gas-air mixture incoming to the ignition chamber from the combustion chamber, increase and the combined conversion reactions are intensified. By the time a spark formation (the discharge energy being at least 200 mJ) the pressure and, respectively, the temperature in the combustion chamber and the ignition chamber goes up to 5-5.5 MPa and 500° C.-600° C. The high discharge energy constitutes one of the distinctive features of the proposed process, as only the discharge in excess of 200 mJ assures ignition of a hydrogen-air mixture at the high degree of compression and, respectively, high pressure level.

Research performed in the process of embodying the claimed invention has proved reliability of the data presented in Reference [5] and [6], and enabled a practical application of producing the optimal hydrogen-air mixture in the ignition chamber. Hydrogen, due to its minimal weight, conglomerates in the ignition chamber 4 near the spark plug 5, in the channel 8 connecting the ignition chamber 4 with the combustion chamber 1, and layer-wise at the outlet of the channel 8. By the time of spark formation, hydrogen, in quantity sufficient for intensive ignition of the main gas-air mixture in the whole volume of the combustion chamber, is conglomerated in the vicinity of the spark plug 5, thus excluding detonation at high compression levels up to 15.

Hydrogen has a very wide concentration range of ignition by volume in air—from 4.09% to 80%; a similar property is intrinsic to carbon monoxide—from 12.5% to 80%; whereas methane has a range of 5.28% to 15.4%. Hydrogen has a higher diffusion factor—0.66 $cm^2$/sec in contrast to that of methane—0.196 $cm^2$/sec. To ignite hydrogen, one needs approximately 17 times lower energy. The minimal energy required for hydrogen ignition, is 0.019 mJ; for methane it is 0.33 mJ (see Gainullin F. G.—Natural gas as engine fuel in transport F. G. Gainullin, A. I. Grishchenko, Y. N. Vasiliev, L. S. Zolotarevsky.—Moscow, Nedra, 1986, p. 255) (Reference [7]).

The above data offer a possibility of secure ignition a hydrogen-air mixture at spark formation near the spark plug 5. Further, the torch of the burning hydrogen-air mixture penetrates the combustion chamber 1 igniting, with a broad front, the main lean gas-air mixture, thus ensuring stable operation of the engine without detonation at the high compression level within the required ranges of revolutions, loads and transitional operation modes. Accordingly, the reliability, performance and environmental safety of the engine are enhanced.

It should be particularly noted, that there is no need of strict monitoring the hydrogen-air in the ignition chamber 4 since hydrogen has very wide concentration range of ignition by volume in air—from 4.09% to 80%. The volume of the ignition chamber, together with the connecting channel 8, constitutes about 3% to 10% of the combustion chamber 1 volume; it depends on the design, size, specific speed of the engine and on many other less important parameters.

The claimed method is applicable in manufacturing gas piston engines with spark ignition on the basis of conventional diesel engines. A diesel engine is modified to a minimal extent, namely, an adapter is installed in the injector seat; the adapter is in the shape of a cylinder with a spark plug at the top, whereas the lower part constitutes the combustion chamber. The spraying nozzle aperture of the injector is used as a connecting channel.

To check efficiency of the claimed invention several diesel engines operating on the natural gas were accordingly converted, namely, YaMZ (238DI, 7514, 850), TMZ-840, KAMAZ (740.58-300, 740.19-200), DAEWOO DOOSAN (P086, P158, P180, P222), and the following results were detained.

A gas piston engine with spark ignition demonstrates steady performance without detonation at the compression level of a diesel engine within the whole range of rotation frequencies, loads and transitional modes, with the air excess factor of 1.5 to 1.8.

The effective efficiency of the experimental samples of gas piston spark plug engines was over 40%.

The environmental effects were minimal in the absence of catalytic agents. The exhaust gas toxicity level (g/kW*hour) was: nitric oxides $NO_x$—2.39 to 3.84; carbonic oxides CO—3.11 to 4.99; hydrocarbons CH—0.79 to 1.15.

The exhaust gas temperature was within the range of 400° C. to 450° C., which results in a significant reliability increase of an engine and extends the engine life (motor resource), especially the exhaust valves and seats.

In each experiment, an ignition chamber together with a connecting channel fits well to replace an injector in a mass-produced diesel engine, thus simplifying the engine conversion for operation on a gas fuel, especially without the compression level change.

The claimed invention is very simple to implement and may be commonly applied in engine manufacturing.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method of operating a spark ignition gas piston engine, comprising the steps of:
    preserving residual gases from a previous ignition cycle and having a temperature within a range of 500° C. to 700° C., in the ignition chamber;
    letting in, during a compression stage, a lean gas-air mixture from an engine cylinder into an ignition chamber;
    wherein the residual gases that include hydrocarbons are used for initiating, upon contact and mixing with the gas-air mixture, a reaction converting lowermost alkanes contained in the hydrocarbons, into hydrogen and carbon monoxide; and
    wherein the reaction in a compression cycle is intensified by increasing pressure up to 5-5.5 MPa and temperature of the gas-air mixture 500-600° C. in the engine cylinder and in the ignition chamber, at a moment of a spark formation.

2. The method of claim 1, wherein the residual gases comprise carbon dioxide 6.7% to 5.6%, oxygen 6.6% to 8.8%, water vapor 12.8% to 19.8% with the air excess factor 1.5 to 1.8.

3. The method of claim 1, wherein the spark has a discharge energy level of at least 200 mJ.

4. The method of claim 1, wherein said ignition chamber is made of a material with catalytic property in respect of the combined conversion reactions of the lowermost alkanes into hydrogen and carbon monoxide.

5. The method of claim 1, wherein the lowermost alkanes include any of methane, ethane, propane, butane.

6. The method of claim 1, wherein the intensification of the combined conversion reaction is catalyzed by ignition chamber material.

7. The method of claim 1, wherein the ignition chamber material is a nickel heat-resistant steel.

* * * * *